(12) United States Patent
Taninouchi et al.

(10) Patent No.: US 8,940,404 B2
(45) Date of Patent: Jan. 27, 2015

(54) TIN-PLATED COPPER-ALLOY MATERIAL FOR TERMINAL AND METHOD FOR PRODUCING THE SAME

(71) Applicant: Mitsubishi Materials Corporation, Tokyo (JP)

(72) Inventors: Yuki Taninouchi, Naka (JP); Naoki Kato, Naka (JP); Kenji Kubota, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 186 days.

(21) Appl. No.: 13/746,512

(22) Filed: Jan. 22, 2013

(65) Prior Publication Data
US 2013/0196171 A1   Aug. 1, 2013

(30) Foreign Application Priority Data
Jan. 26, 2012   (JP) .................................. 2012-014380

(51) Int. Cl.
| | |
|---|---|
| B32B 15/20 | (2006.01) |
| H01R 13/03 | (2006.01) |
| C25D 5/50 | (2006.01) |
| B32B 15/01 | (2006.01) |
| C25D 5/12 | (2006.01) |
| C22C 9/00 | (2006.01) |
| C22C 9/02 | (2006.01) |
| C22C 9/04 | (2006.01) |
| C22C 9/06 | (2006.01) |
| C25D 3/12 | (2006.01) |

(Continued)

(52) U.S. Cl.
CPC ................ *B32B 15/01* (2013.01); *H01R 13/03* (2013.01); *B32B 15/20* (2013.01); *C25D 5/12* (2013.01); *C25D 5/505* (2013.01); *C22C 9/00* (2013.01); *C22C 9/02* (2013.01); *C22C 9/04* (2013.01); *C22C 9/06* (2013.01); *C25D 3/12* (2013.01); *C25D 3/30* (2013.01); *C25D 3/38* (2013.01); *Y10S 428/929* (2013.01); *Y10S 428/939* (2013.01); *Y10S 428/941* (2013.01)
USPC ........... 428/647; 428/646; 428/675; 428/929; 428/939; 428/941; 439/886; 439/887; 205/226; 205/181; 205/182; 427/383.7; 148/518; 148/537

(58) Field of Classification Search
None
See application file for complete search history.

(56) References Cited

U.S. PATENT DOCUMENTS

| | | | | |
|---|---|---|---|---|
| 8,728,629 | B2 * | 5/2014 | Kitagawa et al. | 428/647 |
| 2003/0129441 | A1 * | 7/2003 | Hara et al. | 428/647 |

(Continued)

FOREIGN PATENT DOCUMENTS

| | | | |
|---|---|---|---|
| JP | 4-329891 | * | 11/1992 |
| JP | 2007-063624 A | | 3/2007 |
| JP | 2007-100220 A | | 4/2007 |
| JP | 2010-245098 | * | 10/2010 |
| JP | 2010-258016 | * | 11/2010 |
| JP | 2010-265489 | * | 11/2010 |
| JP | 2010-265542 | * | 11/2010 |
| JP | 2011-026677 | * | 2/2011 |
| JP | 2011-063875 | * | 3/2011 |
| JP | 2011-080117 | * | 4/2011 |
| JP | 2011-219822 | * | 11/2011 |

*Primary Examiner* — John J Zimmerman
(74) *Attorney, Agent, or Firm* — Edwards Wildman Palmer LLP

(57) ABSTRACT

Tin-plated copper-alloy material for terminal having: a substrate made of Cu or Cu alloy; an Sn-based surface layer formed on a surface of the substrate; and a Cu—Ni—Sn alloy layer including Ni formed between the Sn-based surface layer and the substrate, in which the Cu—Ni—Sn alloy layer is made of: fine Cu—Ni—Sn alloy particles; and coarse Cu—Ni—Sn alloy particles, an average thickness of the Sn-based surface layer is not less than 0.2 μm and not more than 0.6 μm, an area ratio of the Cu—Ni—Sn alloy layer exposed at a surface of the Sn-based surface layer is not less than 10% and not more than 40%, and a coefficient of kinetic friction of the tin-plated copper-alloy material for terminal is not more than 0.3.

3 Claims, 9 Drawing Sheets

(51) Int. Cl.
*C25D 3/30* (2006.01)
*C25D 3/38* (2006.01)

(56) References Cited

U.S. PATENT DOCUMENTS

| | | | |
|---|---|---|---|
| 2009/0092851 A1* | 4/2009 | Hatano | 428/647 |
| 2009/0130480 A1* | 5/2009 | Hatano | 428/647 |
| 2010/0266863 A1* | 10/2010 | Tanaka | 428/555 |
| 2011/0003520 A1* | 1/2011 | Kitagawa et al. | 439/887 |
| 2011/0266035 A1* | 11/2011 | Sakurai et al. | 174/255 |
| 2014/0004373 A1* | 1/2014 | Taninouchi et al. | 428/573 |
| 2014/0065440 A1* | 3/2014 | Tsuru | 428/647 |
| 2014/0170436 A1* | 6/2014 | Taninouchi et al. | 428/647 |

* cited by examiner

F I G. 1
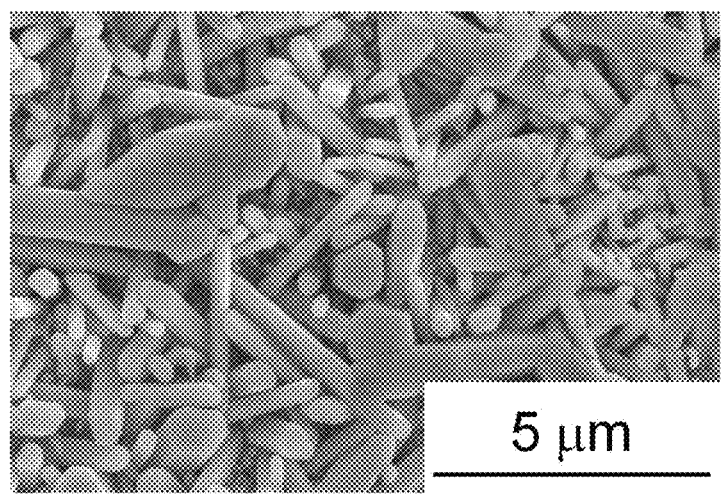

F I G. 8
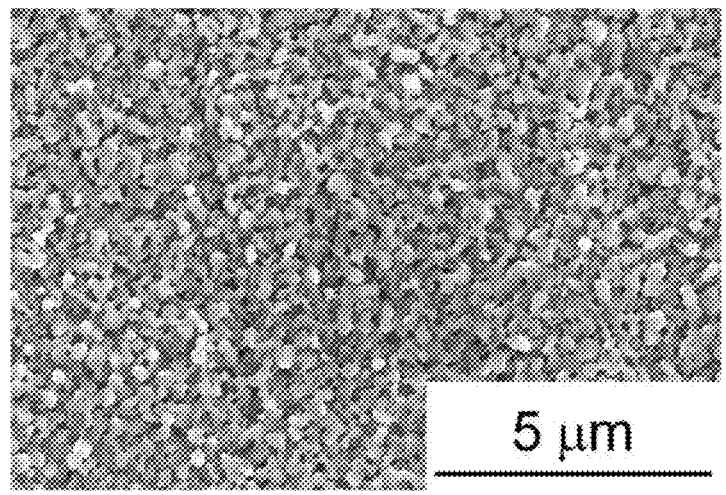

TIN-PLATED COPPER-ALLOY MATERIAL FOR TERMINAL AND METHOD FOR PRODUCING THE SAME

BACKGROUND OF THE INVENTION

1. Field of the Invention

The present invention relates to tin-plated copper-alloy material for terminal and a method for producing the same that is used for connecting electrical wiring of automobiles or personal products, in particular, that is useful for a terminal for a multi-pin connector. Priority is claimed on Japanese Patent Application No. 2012-014380, filed Jan. 26, 2012, the content of which is incorporated herein by reference.

2. Description of Related Art

Tin-plated copper-alloy material for terminal is formed by reflowing after Cu-plating and Sn-plating on a substrate made of copper alloy so as to have a Sn-based surface layer as a surface layer and a Cu—Sn alloy layer as a bottom layer, and is widely used as material for terminal.

In recent years, for example, electrization is rapidly progressed in vehicle and circuits are increased in the electrical equipment, so that connector used in the circuit is remarkably downsized and the pins thereof are increased. When the connector have a lot of pins, even though a force for engaging the connector for a pin is small, since a large force is required for engaging the connector for all pins, it is apprehended that productivity is deteriorated. Therefore, it is attempted to decrease the force for engaging for a pin by reducing the friction coefficient of tin-plated copper-alloy material.

For example, in Japanese Unexamined Patent Application, First Publication No. 2007-100220, a surface-exposure rate of the Cu—Sn alloy layer is configured by roughing the substrate. However, there are problems of increasing contact resistance or decreasing wettability of solder. Also, in Japanese Unexamined Patent Application, First Publication No. 2007-63624, average of surface roughness of the Cu—Sn alloy layer is configured. However, for example, there is a problem in which a coefficient of kinetic friction cannot be reduced to not more than 0.3 for further improving easiness of engaging and disengaging the connector.

SUMMARY OF THE INVENTION

Problems to be Solved by the Invention

In order to reduce the friction coefficient of tin-plated copper-alloy material for terminal, it is effective to expose a part of the Cu—Sn alloy layer that is harder than Sn by thinning the Sn-layer at the surface layer. However, if the Cu—Sn alloy layer is exposed at the surface layer, Cu oxide is generated at the surface layer. As a result, the surface resistance is increased and the wettability of solder is deteriorated. Furthermore, even though the average of the surface roughness of the Cu—Sn alloy layer is controlled, the coefficient of kinetic friction cannot be reduced equal to or less than 0.3.

Means for Solving the Problem

The present invention is achieved in consideration of the above circumstances, and has an object of reducing coefficient of kinetic friction to equal to or less than 0.3 with an excellent electrical-connection characteristic so as to provide tin-plated copper-alloy material for terminal and a method for producing the same with an excellent easiness of engaging and disengaging.

The coefficient of kinetic friction is greatly affected by the structure of a depth of several hundred nm from the surface layer. As a result of research, the inventors of the present invention found that the coefficient of kinetic friction is reduced when the surface layer and the vicinity has a composite construction of Sn and alloy particles having an excellent mechanical strength, since soft Sn reasonably-existing in gaps between hard alloy particles acts as a lubricant. Therefore, it is advantageous for reducing the coefficient of kinetic friction to increase surface roughness of a Cu—Sn compound layer in the bottom layer of a Sn layer in an appropriate extent. However, the ordinary Cu—Sn alloy layer is coarse and has small roughness as shown in FIG. 5, so that the thickness of the Sn layer should be less than 0.1 μm. As a result, the wettability of solder may be deteriorated, and the contact resistance may be increased.

The inventors studied assiduously, and found that the coefficient of kinetic friction can be reduced to equal to or less than 0.3 by forming a Cu—Sn compound layer including Ni (i.e., a Cu—Ni—Sn alloy layer) as an alloy layer so as to intermix Cu—Ni—Sn alloy particles containing a high proportion of Ni and relatively coarse Cu—Ni—Sn alloy particles in a state of fine column crystal containing a low proportion of Ni; and by setting the average thickness of the Sn layer (the surface layer) in a range of not less than 0.2 μm and not more than 0.6 μm. Furthermore, reflow-Sn plating material is known to increase the coefficient of kinetic friction when the vertical load is decreased for measuring the coefficient of the kinetic friction. However, the inventors found that the coefficient of kinetic friction is almost not changed if the vertical load is decreased; so that the present invention is effective for small terminals.

A tin-plated copper-alloy material for terminal according to the present invention, has: a substrate made of Cu or Cu alloy; an Sn-based surface layer formed on a surface of the substrate; and a Cu—Ni—Sn alloy layer including Ni formed between the Sn-based surface layer and the substrate, wherein the Cu—Ni—Sn alloy layer is made of: fine Cu—Ni—Sn alloy particles containing Ni not less than 10 at % and not more than 40 at % in a state of column crystal having a cross-sectional diameter of not less than 0.1 μm and not more than 0.8 μm and an aspect ratio of not less than 1.5; and coarse Cu—Ni—Sn alloy particles having a cross-sectional diameter more than 0.8 μm, an average thickness of the Sn-based surface layer is not less than 0.2 μm and not more than 0.6 μm, an area ratio of the Cu—Ni—Sn alloy layer exposed at a surface of the Sn-based surface layer is not less than 10% and not more than 40%, and a coefficient of kinetic friction of the tin-plated copper-alloy material for terminal is not more than 0.3.

In the Cu—Sn alloy layer which does not include Ni, as shown in FIGS. 5 and 7, coarse Cu—Sn alloy particles having small roughness grow directly under Sn. As a result, gaps between alloy particles are small, so that composite structure suitable at a surface layer of a film cannot be obtained. On the other hand, if fine column Cu—Ni—Sn alloy particles and coarse Cu—Ni—Sn alloy particles each having the different contents grow unevenly, as shown in FIGS. 1, 3, and 4, an alloy structure having an excellent mechanical strength and large gaps between the particles is formed. As a result, the surface layer of the film is composite-structured by Sn and the Cu—Ni—Sn alloy particles, so that the low coefficient of kinetic friction can be realized.

The Ni content of fine column Cu—Ni—Sn alloy particles is limited to not less than 10 at % and not more than 40 at %: because if it is less than 10 at %, the fine column crystal particles having a cross-sectional diameter of not more than 0.8 µm and an aspect ratio of not less than 1.5 cannot be obtained; and if it is more than 40 at %, it is deviated from a solid solubility limit of Ni.

The Ni content of the Coarse Cu—Ni—Sn alloy particles is not limited as long as the cross-sectional diameter is more than 0.8 µm; but can be set to not less than 0.5 at % and not more than 10 at % for example.

There is a case in which 20% or less of the Cu—Ni—Sn alloy particles which are deviated from the abovementioned composition and size content in each crystal particles structuring the Cu—Ni—Sn alloy layer. The present invention can accept the case in which such Cu—Ni—Sn alloy particles are included at 20% or less.

A Cu—Sn alloy layer not including Ni may be or need not to be formed between the Cu—Ni—Sn alloy layer and the substrate. Ni—Sn compound such as $Ni_3Sn_4$ or Ni aggregate may exist between the Sn-based surface layer and the substrate to the extent of the excellent friction property is not deteriorated.

The average thickness of the Sn-based surface layer is limited to not less than 0.2 µm and not more than 0.6 µm: because if it is less than 0.2 µm, the wettability of solder and the reliability of electrical connection are deteriorated; and if it is more than 0.6 µm, the surface layer is not the composite structure of Sn and the Cu—Ni—Sn alloy and occupied only by Sn, so that the coefficient of kinetic friction is increased. The average thickness of the Sn-based surface layer is more preferably not less than 0.3 µm and not more than 0.5 µm.

If the exposed area ratio of the Cu—Sn alloy layer at the surface of a Sn-based surface layer is less than 10%, the coefficient of kinetic friction cannot be suppress under 0.3. If the exposed area ratio of the Cu—Sn alloy layer exceeds 40%, electrical connection characteristic such as the wettability of solder or the like is deteriorated. More preferably, the exposed area ratio is not less than 10% and not more than 30%.

In the tin-plated copper-alloy material for terminal, a barrier layer including Ni or Ni alloy having a thickness of not less than 0.05 µm and not more than 0.5 µm between the substrate and the Cu—Ni—Sn alloy layer.

In a structure of the substrate/Cu—Sn/Cu—Ni—Sn/Sn or a structure of the substrate/Cu—Ni—Sn/Sn, if it is held in high temperature over 100° C., Cu is diffused from the substrate, so that all Sn in the surface layer is alloyed and Cu—Sn alloy is generated. As a result, electrical reliability may be deteriorated. Therefore, a plated layer of Ni or Ni alloy as the barrier layer is inserted between the substrate and a Cu—Sn alloy layer or a Cu—Ni—Sn alloy layer, so that the diffusion of Cu from the substrate can be prevented and high electrical reliability can be maintained even at high temperature over 100° C. In addition, if the barrier layer is less than 0.05 µm, the barrier effect cannot be obtained enough; if the barrier layer is more than 0.5 µm, the barrier layer may be cracked when a bending work is performed. Therefore, the barrier layer is limited from not less than 0.05 µm and not more than 0.5 µm.

A method for producing tin-plated copper-alloy material for terminal according to the present invention has steps of: forming a Cu-plated layer so as to have a thickness of not less than 0.1 µm and not more than 0.5 µm on a substrate made of Cu or Cu alloy; forming a Ni-plated layer so as to have a thickness of not less than 0.005 µm and not more than 0.06 µm on the substrate after forming the Cu-plated layer; forming an Sn-plated layer so as to have a thickness of not less than 0.7 µm and not more than 1.5 µm on the substrate after forming the Ni-plated layer; and reflowing the substrate after forming the Sn-plated layer by: rising surface temperature of the substrate to not lower than 240° C. and not higher than 360° C., maintaining the surface temperature for not less than 1 second to not more than 12 seconds, and rapid cooling the substrate, wherein an Sn-based surface layer is formed on the substrate with an intermediate Cu—Ni—Sn alloy layer.

By forming the thin Ni-plated layer between the Cu-plated layer and the Sn-plated layer, a Cu—Ni—Sn alloy layer having excellent mechanical strength and large gaps between particles is formed after the reflow treatment between the Sn-based surface layer and the substrate. If the film thickness of the Cu-plated layer is less than 0.1 µm, additive elements in the substrate cannot be prevented from diffusing to the film; if the film thickness is more than 0.5 µm, the characteristic of the Cu-plated layer cannot further be improved.

If the thickness of the Ni-plated layer is less than 0.005 µm, Ni cannot be melted enough into the Cu—Ni—Sn alloy layer in a state of solid solution; if the thickness is more than 0.06 µm, as shown in FIG. 8, Ni—Sn alloy such as $Ni_3Sn_4$ is preferentially generated, so that the Cu—Ni—Sn alloy layer is prevented from appropriate growing.

If the thickness of the Sn-plated layer is less than 0.7 µm, the Sn-based surface layer after the reflow treatment is thin and the electrical connection characteristic is deteriorated; if the thickness is more than 1.5 µm, the exposure area of the Cu—Ni—Sn alloy layer at the surface is decreased, so that it is difficult to suppress the coefficient of kinetic friction to less than 0.3.

In the reflow treating, it is important to rise the surface temperature of the substrate to not lower than 240° C. and not higher than 360° C. and hold the temperature for not less than 1 second and not more than 12 seconds of holding time, and then rapidly cool. If the surface temperature is lower than 240° C. or the holding time is too short, Sn cannot be melted enough, so that the Cu—Ni—Sn alloy layer cannot be obtained; if the surface temperature is higher than 360° C. or the holding time is too long, Cu—Ni—Sn alloy grows too much and the exposure area rate thereof at the surface is too large, so that the Sn-based surface layer is oxidized undesirably.

Effects of the Invention

According to the present invention, by reducing the coefficient of kinetic friction, the low contact resistance, the excellent wettability, and the easiness of engaging and disengaging can be obtained in the tin-plated copper-alloy material for terminal. Also, the coefficient of kinetic friction can be reduced even though the vertical load is low, so that the material according to the present invention is suitable for a small terminal. Particularly, terminals which are used in the automobile and electronic elements are advantageous at portions in which the low insertion force for engaging, the stable contact resistance, and the excellent wettability of solder is required.

BRIEF DESCRIPTION OF THE DRAWINGS

FIG. 1 is an SEM photomicrograph showing a surface of a Cu—Ni—Sn alloy layer after removing an Sn-based surface layer of copper-alloy material for terminal of Example 1 according to the present invention.

FIG. 8 is an SIM photomicrograph showing a surface of a Ni—Sn alloy layer after removing an Sn-based surface layer of a copper-alloy material for terminal of a Comparative Example 2.

DESCRIPTION OF THE PREFERRED EMBODIMENTS

An embodiment of a tin-plated copper-alloy material for terminal according to the present invention will be described. The tin-plated copper-alloy material for terminal of the present embodiment is provided with a substrate made of Cu alloy in which an Sn-based surface layer is formed on a surface thereof; and a Cu—Ni—Sn alloy layer is formed between an Sn-based surface layer and the substrate. A composition of the substrate is not limited if it is made of Cu or Cu alloy.

The Cu—Ni—Sn alloy layer is formed by forming a Cu-plated layer, an Ni-plated layer, and an Sn-plated layer sequentially on the substrate and then operating a reflow treatment as described below, so as to be made of Cu—Ni—Sn alloys having different contents of Ni, i.e., fine Cu—Ni—Sn alloy particles with high-Ni solid-solubility containing Ni not less than 10 at % and not more than 40 at % in a state of column crystal having a cross-sectional diameter of not less than 0.1 μm and not more than 0.8 μm and an aspect of not less than 1.5; and coarse Cu—Ni—Sn alloy particles with low-Ni solubility of e.g., not less than 0.5 at % and not more than 10 at % having a cross-sectional diameter of more than 0.8 μm.

An average thickness of the Sn-based surface layer is not less than 0.2 μm and not more than 0.6 μm. A part of the lower Cu—Ni—Sn alloy layer is exposed at a surface of the Sn-based surface layer so that an area ratio of the exposed art is not less than 10% and not more than 40%.

The material for terminal having such a structure has a composite construction in which the hard Cu—Ni—Sn alloy layer is intermediated between the Sn-based surface layer and the substrate in a depth range of a several hundred tun from the surface of the Sn-based surface layer. A part of the hard Cu—Ni—Sn alloy layer is exposed from the Sn-based surface layer so that soft Sn around the exposed parts of the Cu—Ni—Sn alloy layer acts as lubricant. As a result, low coefficient of kinetic friction of not more than 0.3 can be realized. Furthermore, an exposed area ratio of the Cu—Ni—Sn alloy layer is not less than 10% and not more than 40%, so that an excellent electrical connection characteristic of the Sn-based surface layer is not spoiled.

Figure 3:
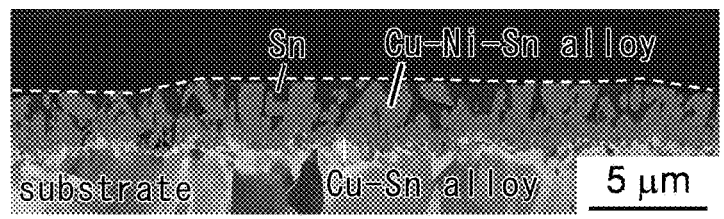
FIG. 3 is an SIM photomicrograph showing a section of the copper-alloy material for terminal of Example 1 with magnified by 2 times.
Figure 4:
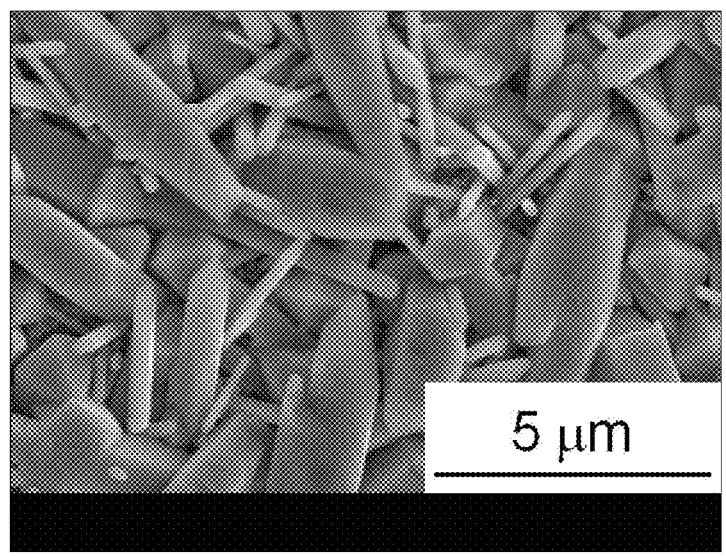
FIG. 4 is an SIM photomicrograph showing a surface of a Cu—Ni—Sn alloy layer after removing a Sn-based surface layer of a copper-alloy material for terminal of Example 2.

In this case, the Cu—Ni—Sn alloy layer has the structure in which the fine Cu—Ni—Sn alloy particles having the cross-sectional diameter of not more than 0.8 μm and the aspect ratio of not less than 1.5 in the column-crystal shape and the coarse Cu—Ni—Sn alloy particles having the cross-sectional diameter of more than 0.8 μm are mixed. Therefore, an alloy organization having an excellent mechanical strength and large gaps between particles can reach the surface layer at a part as shown in FIGS. 1, 3, and 4. As a result, the low coefficient of kinetic friction can be obtained.

The Ni content of the fine column-crystal Cu—Ni—Sn alloy particles is limited in the range of not less than 10 at % and not more than 40 at %, because the column-crystal particles with the cross-sectional diameter of not more than 0.8 μm and the aspect ratio of not less than 1.5 cannot be obtained if the Ni content is less than the range; and the Ni is deviated from the solid solubility limit if the Ni content exceeds the range. It is more preferable that the range is not less than 13 at % and not more than 28 at %.

The Ni content of the coarse Cu—Ni—Sn alloy particles is interrelated to the particle size, but is not limited if the cross-sectional diameter is more than 0.8 μm; and may be set to not less than 0.5 at % and not more than 10 at %, for example. If the Ni content is high, the particle size becomes small. If the Ni content is low, alloy growth to the surface layer is insufficient, so that it is difficult to obtain the composite structure. In the coarse Cu—Ni—Sn alloy particles, there is a case in which both the column-crystal particles having the aspect ratio and globular-crystal particles are included. The cross-sectional diameter of the column particles is a short length thereof. The cross-sectional diameter of the globular particles is a diameter thereof.

Particles which are deviated from the aforementioned Ni content and the particle shape may be included within 20% in the Cu—Ni—Sn alloy layer. Between the Cu—Ni—Sn alloy layer and the substrate, a Cu—Sn alloy layer which does not include Ni may be generated or not be generated. Ordinarily, the Cu—Sn alloy layer is generated; however, there is a case in which the Cu—Sn alloy layer is not generated according to a sort of copper-alloy and a plating thickness of Cu. The friction property is not affected by the Cu—Sn alloy layer in either case. Furthermore, if the excellent friction property can be obtained, Ni—Sn compound such as $Ni_3Sn_4$ or Ni aggregates can exist between the Sn-based surface layer and the substrate.

When the thickness of the Sn-based surface layer is less than 0.2 μm, wettability of solder is deteriorated and electrical connection reliability is deteriorated; on the other hand, when the thickness of the Sn-based surface layer is more than 0.6 μm, the composite construction of the surface layer and the Cu—Ni—Sn alloy cannot be obtained, i.e., the surface layer is occupied by Sn, so that the coefficient of kinetic friction is increased. More preferably, the average thickness of the Sn-based surface layer is not less than 0.3 μm and not more than 0.5 μm.

When the exposed-area rate of the Cu—Ni—Sn alloy layer to the surface is less than 10%, the coefficient of kinetic friction cannot be suppressed below 0.3; on the other hand, when the exposed-area rate of the Cu—Ni—Sn alloy layer to the surface is more than 40%, the electrical connection reliability such as wettability of solder or the like is deteriorated. More preferably, the exposed-area rate is not less than 10% and not more than 30%.

Next, a method for producing the material for terminal will be explained.

A surface of a Cu plate or a Cu-alloy plate for a substrate is cleaned by degreasing, pickling and the like. Then, Cu plating, Ni plating and Sn plating is operated consequently on the surface.

An ordinary Cu-plating bath, for example, a copper-sulfate plating bath containing copper sulfate ($CuSO_4$) and sulfuric acid ($H_2SO_4$) as major ingredients can be used for Cu plating.

Temperature of the plating bath is set to not lower than 20° C. and not higher than 50° C. Current density of the plating bath is set to not lower than 1 A/dm² and not higher than 20 A/dm². A film thickness of a Cu-plated layer which is formed by the Cu plating is not less than 0.1 μm and not more than 0.5 μm. If the film thickness is less than 1 an influence of the alloy substrate is so great that defectives cannot be prevented from occurring by the influence of rolling marks on the substrate; and a diffusion of additive elements from the substrate to the film cannot be suppressed. As a result, the characteristic cannot be further improved even though Cu is plated over 0.5 μm, so that it is economically disadvantageous.

An ordinary Ni-plating bath, for example, a sulfate bath containing sulfuric acid ($H_2SO_4$) and nickel sulfate ($NiSO_4$) as major ingredients, a chloride bath containing hydrochloric acid (HCl) and nickel chloride ($NiCl_2$) as major ingredients can be used for forming an Ni-plated layer. Temperature of the plating bath is set to not lower than 20° C. and not higher than 50° C. Current density of the plating bath is set to not lower than 0.5 A/dm² and not higher than 30 A/dm². A film thickness of the Ni-plated layer is not less than 0.005 μm and not more than 0.06 μm. If the film thickness is less than 0.005 μm, the solid solubility of Ni to the Cu—Ni—Sn alloy layer is not enough. If the film thickness is more than 0.06 μm, Ni—Sn compound such as $Ni_3Sn_4$ is antecedently generated, so that Cu—Ni—Sn alloy layer is prevented from appropriate growing.

An ordinary Sn-plating bath, for example, a sulfate bath containing sulfuric acid ($H_2SO_4$) and stannous sulphate ($SnSO_4$) as major ingredients can be used for forming an Sn-plated layer. Temperature of the plating bath is set to not lower than 15° C. and not higher than 35° C. Current density of the plating bath is set to not lower than 1 A/dm² and not more than 30 A/dm². A film thickness of the Sn-plated layer is not less than 0.7 μm and not more than 1.5 μm. By setting the film thickness of the Sn-plated layer to this range, the thickness of the Sn-based surface layer after the reflow treatment can be controlled to not less than 0.2 μm and not more than 0.6 μm.

As the condition for the reflow treatment, the substrate is heated in a state in which a surface temperature is not less than 240° C. and not more than 360° C. for not less than 1 second and not more than 12 seconds in a reduction atmosphere, and then the substrate is rapidly cooled. More preferably, the substrate is heated in a state in which the surface temperature is not less than 260° C. and not more than 300° C. for not less than 5 seconds and not more than 10 seconds, and then the substrate is rapidly cooled. In this case, a holding time tends to be short when the plating thickness is small, and to be long when the plating thickness is large. Because when the temperature is less than 240° C. or the holding time is too short, Sn is melted slowly and the desired Cu—Ni—Sn alloy layer cannot be obtained; on the other hand, when the temperature is more than 360° C. or the holding time is too long, the Cu—Ni—Sn alloy grows to excess and a desired shape cannot be obtained, and the Cu—Ni—Sn alloy layer reaches the surface layer, so that the Sn-based surface layer remaining at the surface is too small (i.e., the exposed area rate of the Cu—Ni—Sn alloy layer to the surface is too large). Furthermore, when a heating condition is high, it is not desirable that the oxidation of the Sn-based surface layer is advanced.

EXAMPLES

Three copper alloys (Cu—Ni 2% in mass-Zn-1.0% in mass-Si 0.5% in mass, Cu—Mg 0.7%-P 0.005% in mass, Cu—Zn 30% in mass) having a plate thickness of 0.25 mm were the substrates. Cu-plating, Ni-plating, and Sn-plating were operated consequently on the substrates. Regarding some samples, Ni-plating as a barrier layer was operated before Cu-plating. In this case, the plating conditions of Cu, Ni, and Sn were the same in Examples and Comparative Examples, as shown in Table 1. In Table 1, Dk denotes the current density of a cathode, and ASD is an abbreviation of A/dm².

TABLE 1

| | Cu-plating | | Ni-plating | | Sn-plating | |
|---|---|---|---|---|---|---|
| Composition of Plating Bath | Copper Sulfate | 250 g/L | Nickel Sulfate | 300 g/L | Tin Sulfate | 75 g/L |
| | Sulfric Acid | 50 g/L | Sulfric Acid | 2 g/L | Sulfric Acid | 85 g/L |
| | | | | | Additive | 10 g/L |
| Liquid Temperature | 25° C. | | 45° C. | | 25° C. | |
| Dk | 5 ASD | | 5 ASD | | 5 ASD | |

After plating at thicknesses shown in Table 2, the reflow treatment were operated to the substrates of Examples and the Comparative Examples in the conditions shown in Table 2, the substrates were held in the reduction atmosphere under the conditions in which the surface temperature of the substrates were in a prescribed range, and then the substrates were cooled by water.

As the Comparative Examples, the substrates in which the plate thicknesses of Cu, Ni, and Sn were varied so that the film thickness of the Sn-based surface layer was out of the prescribed range were prepared. Conditions of those test pieces were shown in Table 2.

TABLE 2

| | Composition of Substrate | Film Thickness of Plating (μm) | | | | |
|---|---|---|---|---|---|---|
| | (mass %) | Barrier Ni | Cu | Ni | Sn | Reflow Condition |
| Example 1 | Cu—Ni2—Zn1.0—Sn0.5—Si0.5 | 0 | 0.3 | 0.01 | 1 | 270° C. × 2 sec |
| Example 2 | Cu—Mg0.7—P0.005 | 0 | 0.3 | 0.06 | 0.8 | 270° C. × 3 sec |
| Example 3 | Cu—Mg0.7—P0.005 | 0 | 0.3 | 0.01 | 0.7 | 270° C. × 3 sec |
| Example 4 | Cu—Mg0.7—P0.005 | 0 | 0.3 | 0.01 | 1 | 245° C. × 6 sec |
| Example 5 | Cu—Zn30 | 0 | 0.5 | 0.01 | 1.5 | 270° C. × 12 sec |
| Example 6 | OFC | 0 | 0.3 | 0.005 | 1 | 270° C. × 6 sec |
| Example 7 | Cu—Mg0.7—P0.005 | 0 | 0.3 | 0.03 | 0.8 | 270° C. × 1 sec |
| Example 8 | OFC | 0 | 0.1 | 0.01 | 1 | 270° C. × 0.5 sec |
| Example 9 | Cu—Mg0.7—P0.005 | 0 | 0.3 | 0.01 | 1 | 270° C. × 12 sec |
| Example 10 | Cu—Mg0.7—P0.005 | 0 | 0.3 | 0.01 | 1 | 360° C. × 3 sec |
| Example 11 | Cu—Mg0.7—P0.005 | 0.05 | 0.3 | 0.01 | 1 | 270° C. × 3 sec |
| Example 12 | Cu—Mg0.7—P0.005 | 0.5 | 0.3 | 0.01 | 1 | 270° C. × 3 sec |
| Example 13 | Cu—Ni2—Zn1.0—Sn0.5—Si0.5 | 0 | 0.1 | 0.01 | 1 | 270° C. × 6 sec |

TABLE 2-continued

| | Composition of Substrate | Film Thickness of Plating (μm) | | | | Reflow Condition |
|---|---|---|---|---|---|---|
| | (mass %) | Barrier Ni | Cu | Ni | Sn | |
| Comparative Example 1 | Cu—Ni2—Zn1.0—Sn0.5—Si0.5 | 0 | 0.3 | 0 | 1 | 270° C. × 2 sec |
| Comparative Example 2 | OFC | 0.35 | 0.3 | 0.15 | 1 | 270° C. × 2 sec |
| Comparative Example 3 | Cu—Mg0.7—P0.005 | 0 | 0.3 | 0.08 | 1 | 270° C. × 3 sec |
| Comparative Example 4 | Cu—Ni2—Zn1.0—Sn0.5—Si0.5 | 0 | 0.3 | 0.01 | 1.8 | 270° C. × 6 sec |
| Comparative Example 5 | Cu—Mg0.7—P0.005 | 0 | 0.3 | 0.01 | 1 | 235° C. × 1 sec |
| Comparative Example 6 | Cu—Mg0.7—P0.005 | 0 | 0.3 | 0.01 | 1 | 370° C. × 6 sec |

With respect to those test pieces, average thicknesses of the Sn-based surface layer after the reflow treatment and surface-exposure area rates of the Cu—Ni—Sn alloy layer were measured. Also, average cross-sectional diameters of the Cu—Ni—Sn alloy particles of the column crystal, average aspect rates thereof, and average Ni contents were measured.

The thicknesses of the Sn-based surface layer and the Cu—Ni—Sn alloy layer after the reflow treatment were measured using a Fluorescent X-ray Coating Thickness Gauge (SFT9400 by SII Nanotechnolgy Inc.). At first, the thicknesses of all the Sn-based surface layers of the test pieces after the reflow treatment were measured, and then the Sn-based surface layers were removed by soaking the test pieces in etching liquid for removing plating film containing components which does not corrode Cu—Ni—Sn alloy but etches pure Sn for a several minutes, for example, etching liquid L80 by Leybold Co., Ltd. so that the bottom Cu—Ni—Sn alloy layer was exposed and the thickness of the Cu—Ni—Sn alloy layer was measured. Finally, a difference between the thicknesses of the entire Sn-based surface layer and the thickness of the Cu—Sn alloy layer was defined as the thickness of the Sn-based surface layer.

Figure 2:
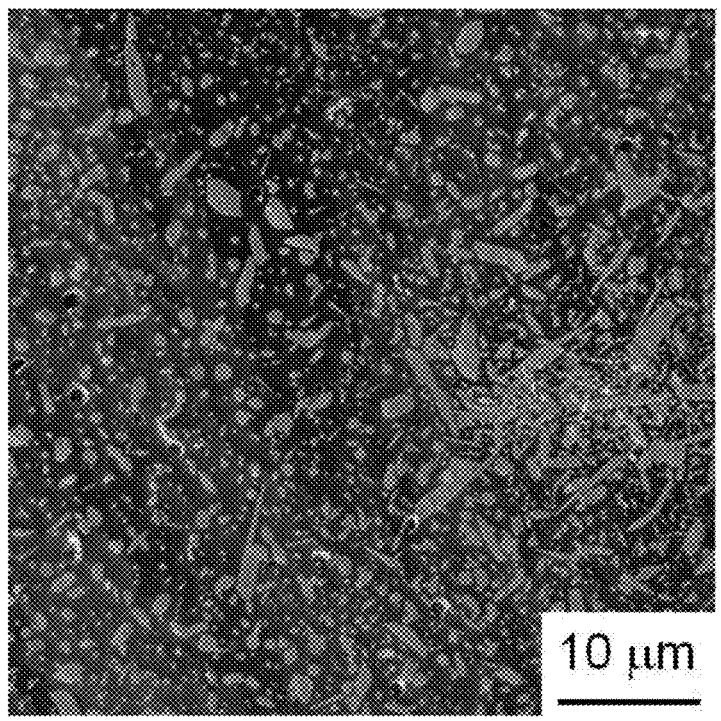
FIG. 2 is an SIM photomicrograph showing a surface of the copper-alloy material for terminal of Example 1.
Figure 6:
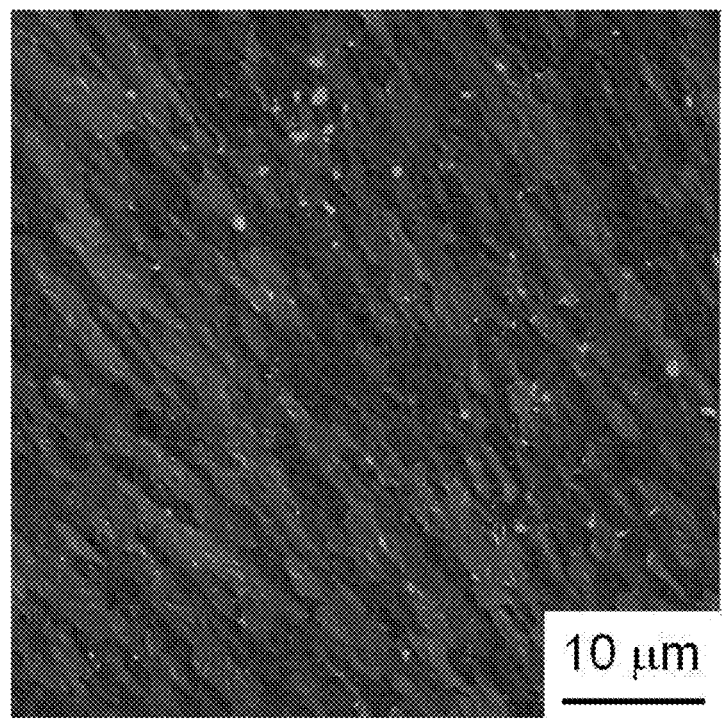
FIG. 6 is an SIM photomicrograph showing the surface of a copper-alloy material for terminal of the Comparative Example 1.

The exposed area rate of the Cu—Ni—Sn alloy layer was observed by a scanning ion microscope at an area of 100×100 μm after removing a surface oxide film. According to a measurement principle, when Cu—Ni—Sn alloy exists in a depth area of about 20 nm from the outermost surface, the image of Cu—Ni—Sn alloy is imaged by white color as shown in FIG. 2 and FIG. 6. Therefore, using image processing software, the rate of the white area to the whole area of the measured area was considered as the exposed rate of Cu—Ni—Sn alloy.

The average of the sectional-diameter and the average of the aspect ratio of the fine column-crystal Cu—Ni—Sn alloy particles were calculated by observing 20 particles using an electron microscope (SEM).

The average of the Ni content of the fine column-crystal was calculated by measuring 10 particles using a scanning-transmission electron microscope (JEM-2010F, manufactured by Japan Electron Optics Laboratory Co., LTD) with an energy-dispersion X-ray analysis detector When obtaining the coefficient of kinetic friction, in order to simulate a contact portion between a male terminal and a female terminal of a engagement-type connector, a plate-like male test piece and a hemispherical female test piece having a internal diameter of 1.5 mm were prepared for each of the samples. Then, using a device for measuring friction (μV1000, manufactured by Trinity Lab INC.), friction force between the test pieces was measured and the coefficient of kinetic friction was obtained.

Figure 9:
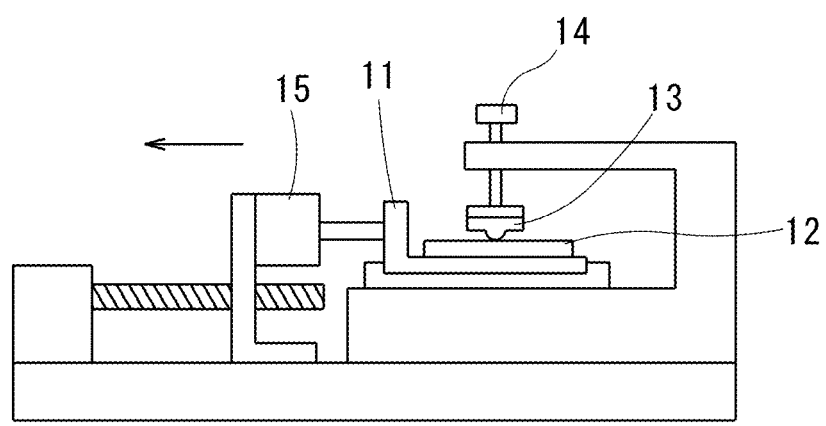
FIG. 9 is a schematic front view showing an apparatus for measuring coefficient of kinetic friction.

As shown in FIG. 9, the male test piece 12 was fixed on a horizontal table 11, and the convex surface of the female test piece 13 was disposed on the male test piece 12 so that the plated surfaces were in contact with each other. The male test piece 12 was pressed by the female test piece 13 with a weight 14 so as to be applied a load P of 100 gf or 500 gf. The friction power F was measured by a load cell 15 when the male test piece 12 was horizontally dragged for 10 mm with a sliding speed of 80 mm/min along an illustrated arrow while the load P was applied. The coefficient of kinetic friction (=Fav/P) was obtained from the average Fav of the friction force F. In Table 3, the both coefficients of kinetic friction were described when the load P was 0.98 N (i.e., 100 gf) and when the load P was 4.9 N (i.e., 500 gf).

When obtaining the wettability of the soldering, the test pieces were cut with a width of 10 mm, and zero crossing time were measured by the meniscograph method using a rosin-type active flux. (The test pieces were soaked in Sn-37% Pb solder with temperature of the soldering bath of 230° C., soaking rate of 2 mm/sec, soaking depth of 2 mm, and soaking time of 10 sec.) If the solder zero crossing time is not less than 3 seconds, it was estimated at "good". If the solder zero crossing time is more than 3 seconds, it was estimated at "not good".

In order to estimate the electrical reliability, the test pieces were heated in the atmosphere, 150° C.×500 hours, and the contact resistance was measured. The measuring method was in reference to JIS-C-5402, using a contact resistance measurement device by four terminals (CRS-113-AU, manufactured by Yamasaki-seiki co. ltd.), so that the contact resistances along with a variation of load from 0 g to 50 g in a sliding mode (1 mm) were measured and the value of the contact resistance at the load of 50 g was estimated. The measurement results and estimate results are shown in Table 3.

TABLE 3

| | Average Thickenss of Sn after Reflow Treatment | Exposed Rate of Cu—Ni—Sn (%) | Fine Column Particles of Cu—Ni—Sn | | | Coefficient of Dynamic Friction | | Wettability of Soldering | Contact Resistance (mΩ) | Notes |
|---|---|---|---|---|---|---|---|---|---|---|
| | | | Average Sectional-Diameter (μm) | Average Aspect Ratio | Average Ni Content (at %) | Vertical Load 100 gf | Vertical Load 500 gf | | | |
| Example 1 | 0.40 | 30 | 0.5 | 3 | 16 | 0.24 | 0.22 | good | 3.36 | |
| Example 2 | 0.30 | 32 | 0.2 | 6 | 28 | 0.27 | 0.25 | good | 2.89 | |
| Example 3 | 0.23 | 37 | 0.3 | 3 | 16 | 0.28 | 0.24 | good | 3.52 | |

TABLE 3-continued

|  | Average Thickenss of Sn after Reflow Treatment | Exposed Rate of Cu—Ni—Sn (%) | Fine Column Particles of Cu—Ni—Sn | | | Coefficient of Dynamic Friction | | Wettability of Soldering | Contact Resistance (mΩ) | Notes |
|---|---|---|---|---|---|---|---|---|---|---|
|  |  |  | Average Sectional-Diameter (μm) | Average Aspect Ratio | Average Ni Content (at %) | Vertical Load 100 gf | Vertical Load 500 gf |  |  |  |
| Example 4 | 0.40 | 22 | 0.5 | 4 | 17 | 0.29 | 0.26 | good | 3.28 |  |
| Example 5 | 0.58 | 15 | 0.3 | 3 | 14 | 0.30 | 0.28 | good | 2.11 |  |
| Example 6 | 0.32 | 15 | 0.8 | 1.5 | 13 | 0.30 | 0.27 | good | 4.05 |  |
| Example 7 | 0.37 | 30 | 0.5 | 4 | 23 | 0.23 | 0.21 | good | 3.86 |  |
| Example 8 | 0.55 | 10 | 0.6 | 3 | 15 | 0.30 | 0.28 | good | 2.36 |  |
| Example 9 | 0.22 | 39 | 0.4 | 4 | 20 | 0.25 | 0.22 | good | 7.65 |  |
| Example 10 | 0.26 | 38 | 0.3 | 5 | 16 | 0.30 | 0.21 | good | 5.54 |  |
| Example 11 | 0.40 | 28 | 0.4 | 4 | 18 | 0.25 | 0.22 | good | 1.58 |  |
| Example 12 | 0.43 | 25 | 0.4 | 4 | 16 | 0.26 | 0.22 | good | 0.96 |  |
| Example 13 | 0.35 | 35 | 0.6 | 3 | 16 | 0.24 | 0.23 | good | 4.21 | Cu—Sn layer was not generated |
| Comparative Example 1 | 0.47 | 0 | not generated |  |  | 0.44 | 0.40 | good | 2.19 | Only Cu—Sn alloy was generated |
| Comparative Example 2 | 0.85 | 0 | not generated |  |  | 0.52 | 0.46 | good | 0.88 | Only Ni—Sn alloy was generated |
| Comparative Example 3 | 0.55 | 2 | 0.1 | 7 | 25 | 0.44 | 0.40 | good | 2.99 | Ni—Sn alloy was preferentially generated |
| Comparative Example 4 | 1.40 | 0 | 0.4 | 5 | 15 | 0.70 | 0.54 | good | 1.85 |  |
| Comparative Example 5 | 0.60 | 0 | 0.3 | 4 | 16 | 0.44 | 0.35 | good | 2.03 |  |
| Comparative Example 6 | 0.18 | 70 | 0.8 | 3 | 18 | 0.29 | 0.28 | not good | 11.86 |  |

Obviously from Table 3, in Examples, the coefficient of kinetic friction was small as not more than 0.3, the wettability was good, the glossiness and the appearance were good, and the contact resistance was small. In Examples 1 to 12, the Cu—Sn alloy layer was found between the substrate and the Cu—Ni—Sn alloy layer. In Examples 11 and 12, by providing an Ni-barrier layer, the contact resistance was not more than 2 mΩ after the heat test, so that high electrical reliability was maintained.

Figure 5:
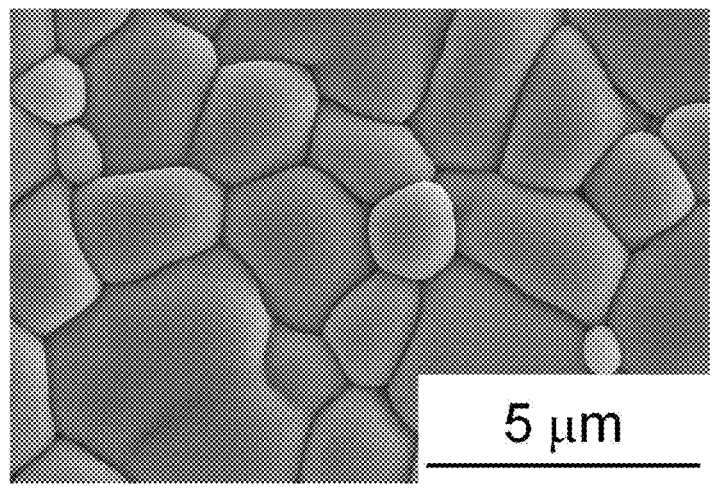
FIG. 5 is an SIM photomicrograph showing a surface of a Cu—Ni—Sn alloy layer after removing an Sn-based surface layer of a copper-alloy material for terminal of a Comparative Example 1.
Figure 7:
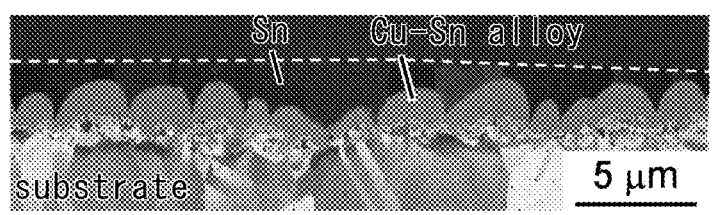
FIG. 7 is an SIM photomicrograph showing a section of the copper-alloy material for terminal for the Comparative Example 1 with magnified by 2 times.

FIGS. 1 to 3 are photomicrographs of the test piece of Example 1. FIG. 4 is a photomicrograph of the test piece of Example 2. FIGS. 5 to 7 are a photomicrograph of the Comparative Example 1. FIG. 8 is a microphotograph of the Comparative Example 2. In FIGS. 2 and 6, black parts are Sn, white parts are Cu—Ni—Sn alloy.

Comparing those photographs, in Examples, the Cu—Ni—Sn alloy layer has a mixed structure of the fine column-crystal Cu—Ni—Sn alloy particles and the coarse Cu—Ni—Sn particles, so that the surface layer portion is a composite structure of the Cu—Ni—Sn alloy layer and the Sn-based surface layer in which a part of the Cu—Ni—Sn alloy layer is exposed at the Sn-based surface layer.

As shown in FIG. 8, in a case in which the Ni-plated layer between the Cu-plated layer and the Sn-plated layer was thick, $Ni_3Sn_4$ was majorly generated, and the Cu—Ni—Sn alloy layer could not be grown appropriately. In Comparative Example 1, coarse $Cu_6Sn_5$ alloy particles were found under the Sn-based surface layer, the exposure of the Cu—Ni—Sn alloy layer to the Sn-based surface layer was small. In Comparative Examples 3 to 5, The Cu—Ni—Sn alloy layer was grown insufficiently, so that the exposure to the Sn-based layer was small; as a result, the coefficient of kinetic friction was more than 0.3. In Comparative Example 6, since the surface-exposure rate was excessively large, so that the wettability of solder was deteriorated.

What is claimed is:

1. A tin-plated copper-alloy material for terminal comprising:
    a substrate made of Cu or Cu alloy;
    an Sn-based surface layer formed on a surface of the substrate; and
    a Cu—Ni—Sn alloy layer including Ni formed between the Sn-based surface layer and the substrate, wherein
    the Cu—Ni—Sn alloy layer is made of: fine Cu—Ni—Sn alloy particles containing Ni not less than 10 at % and not more than 40 at % in a state of column crystal having a cross-sectional diameter of not less than 0.1 μm and not more than 0.8 μm and an aspect ratio of not less than 1.5; and coarse Cu—Ni—Sn alloy particles having a cross-sectional diameter more than 0.8 μm,
    an average thickness of the Sn-based surface layer is not less than 0.2 μm and not more than 0.6 μm,
    an area ratio of the Cu—Ni—Sn alloy layer exposed at a surface of the Sn-based surface layer is not less than 10% and not more than 40%, and
    a coefficient of kinetic friction of the tin-plated copper-alloy material for terminal is not more than 0.3.

2. The tin-plated copper-alloy material for terminal according to claim 1, further comprising a barrier layer consisting of Ni or Ni alloy having a thickness of not less than 0.05 μm and not more than 0.5 μm between the substrate and the Cu—Ni—Sn alloy layer.

3. A method for producing tin-plated copper-alloy material for terminal comprising steps of:
    forming a Cu-plated layer so as to have a thickness of not less than 0.1 μm and not more than 0.5 μm on a substrate made of Cu or Cu alloy;
    forming a Ni-plated layer so as to have a thickness of not less than 0.005 μm and not more than 0.06 μm on the substrate after forming the Cu-plated layer;
    forming an Sn-plated layer so as to have a thickness of not less than 0.7 μm and not more than 1.5 μm on the substrate after forming the Ni-plated layer; and reflowing the substrate after forming the Sn-plated layer by: rising surface temperature of the substrate to not lower than 240° C. and not higher than 360° C., maintaining the surface temperature for not less than 1 second to not more than 12 seconds, and rapid cooling the substrate, wherein an Sn-based surface layer is formed on the substrate with an intermediate Cu—Ni—Sn alloy layer.

* * * * *